E. B. HESS.
WRITING MACHINE.
APPLICATION FILED AUG. 5, 1907.

1,145,017.

Patented July 6, 1915.
5 SHEETS—SHEET 1.

WITNESSES:
L. F. Browning
G. S. Tinley

INVENTOR
Edward B. Hess
Edward C. Davidson
ATTORNEY

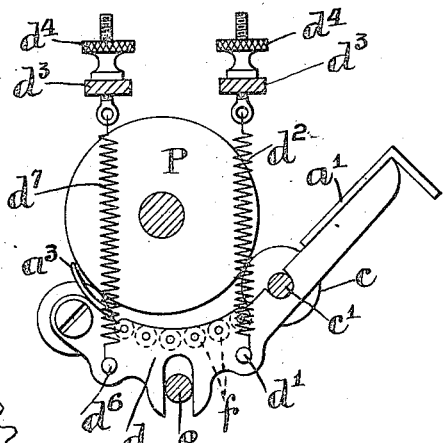
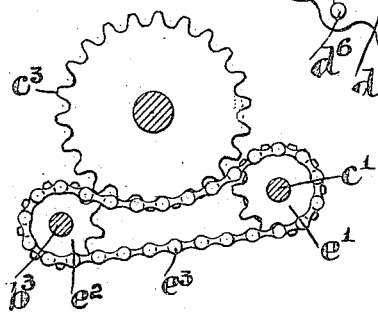
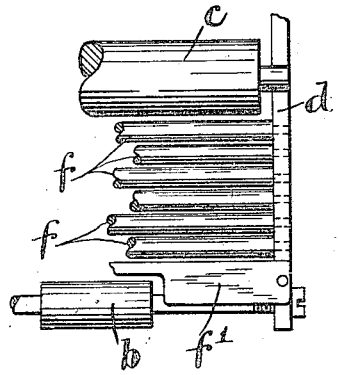
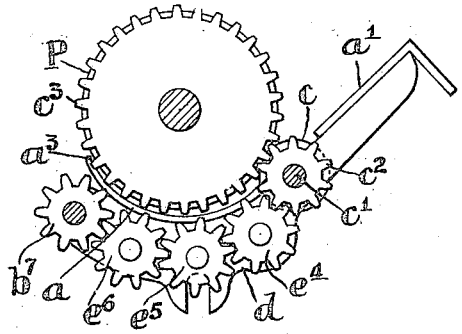
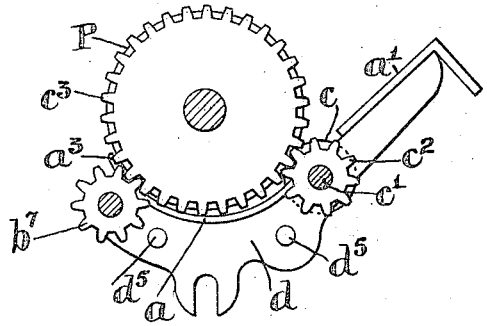

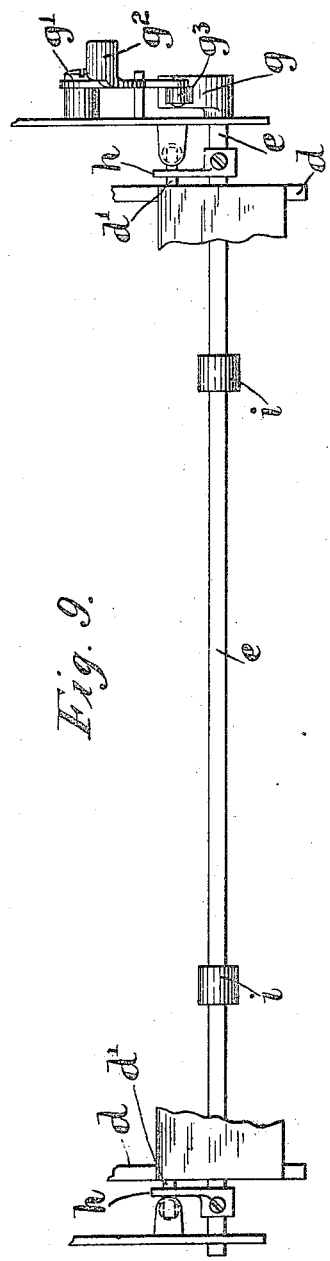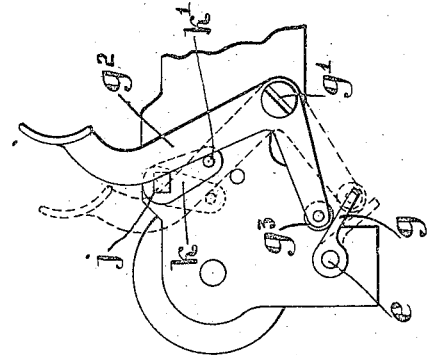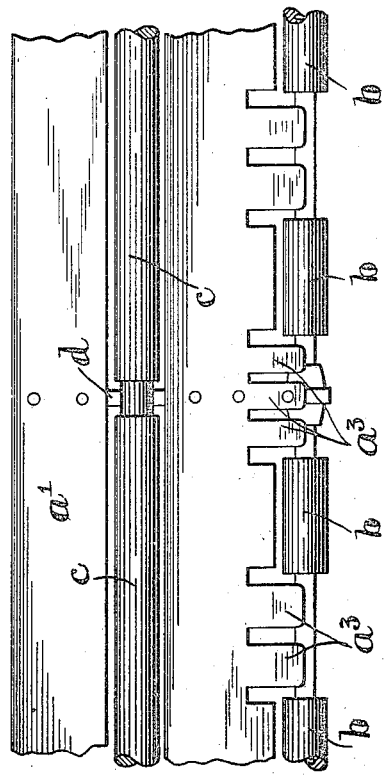

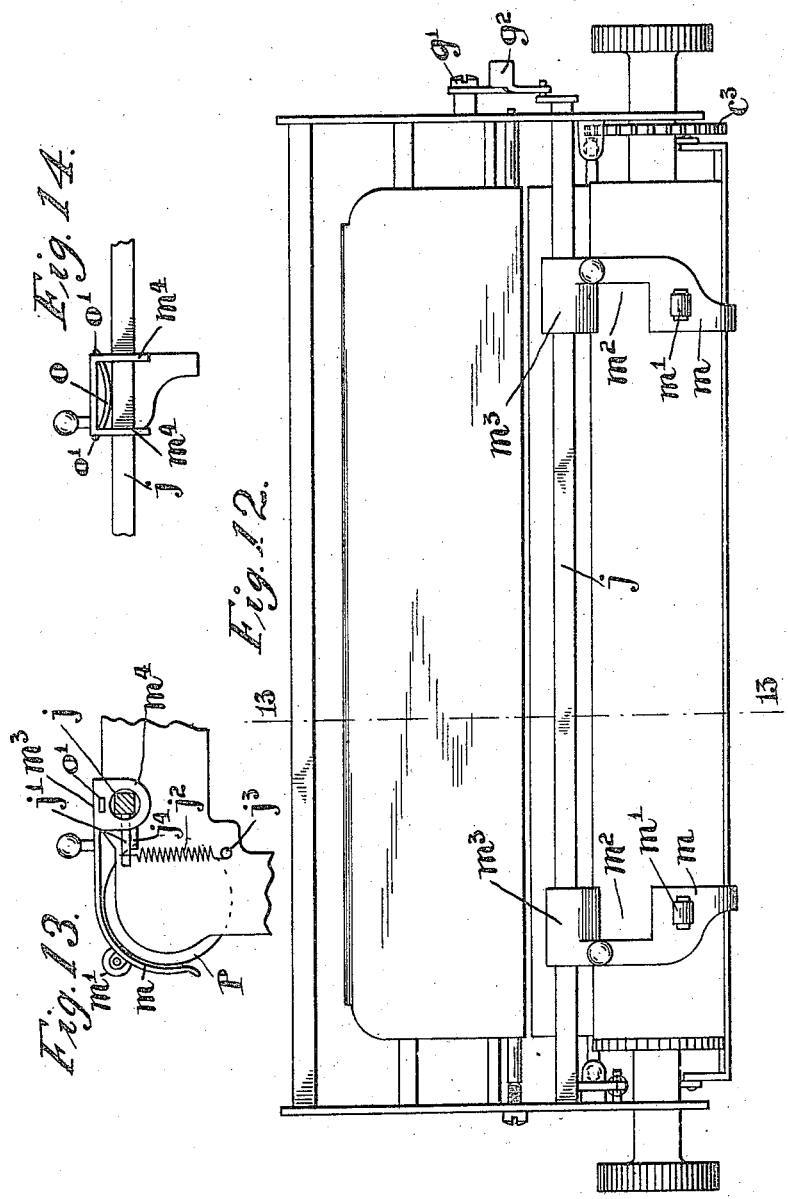

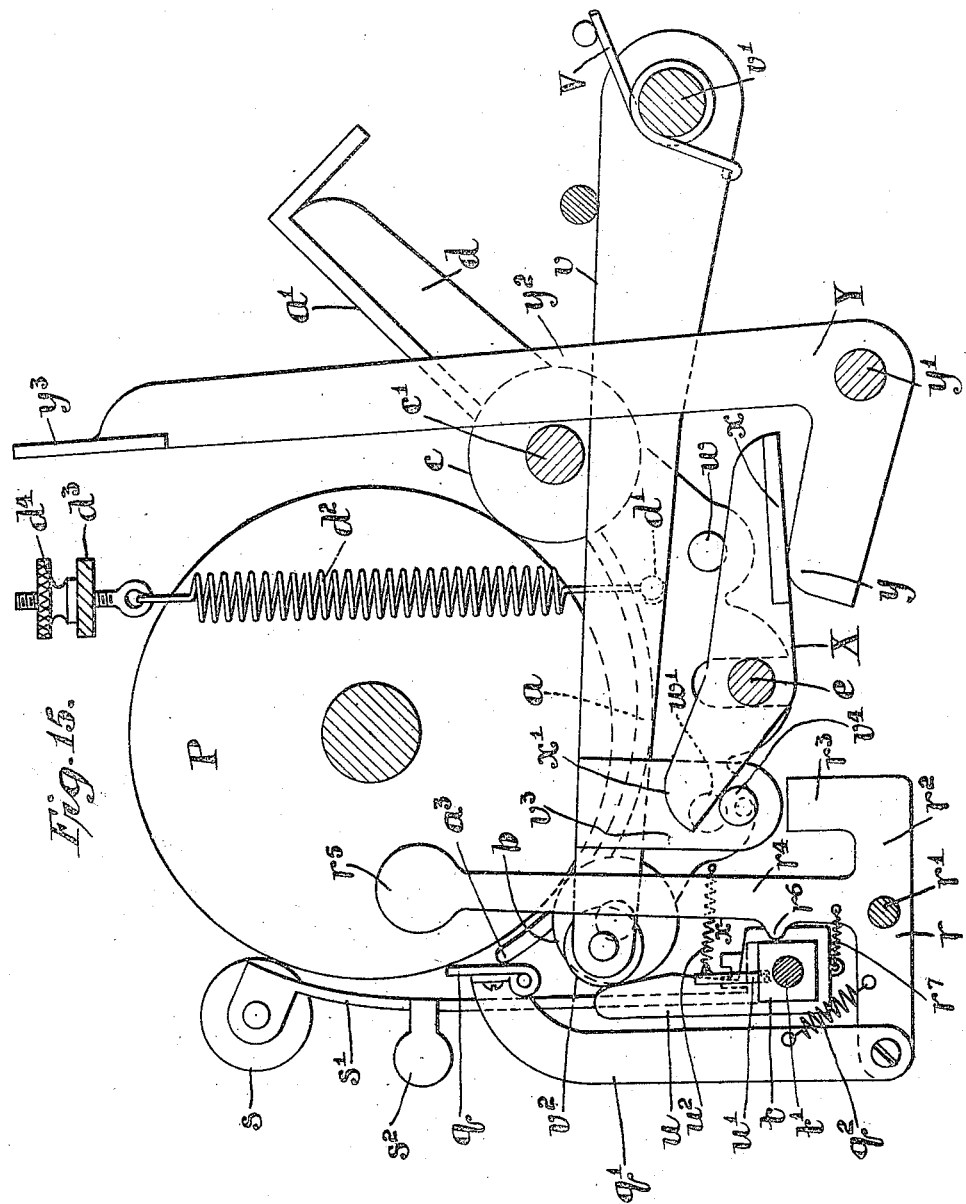

UNITED STATES PATENT OFFICE.

EDWARD B. HESS, OF NEW YORK, N. Y., ASSIGNOR, BY MESNE ASSIGNMENTS, TO ROYAL TYPEWRITER COMPANY, INC., OF NEW YORK, N. Y., A CORPORATION OF NEW YORK.

WRITING-MACHINE.

1,145,017.      Specification of Letters Patent.      Patented July 6, 1915.

Application filed August 5, 1907. Serial No. 387,082.

*To all whom it may concern:*

Be it known that I, EDWARD B. HESS, a citizen of the United States, residing in the borough of Brooklyn, city and State of New York, have invented certain Improvements in Writing-Machines, of which the following is a specification.

This invention relates to the paper feed devices of a typewriting machine and comprises certain improvements on paper feed devices shown in Letters Patent No. 861,978 granted July 30, 1907.

Figure 1:
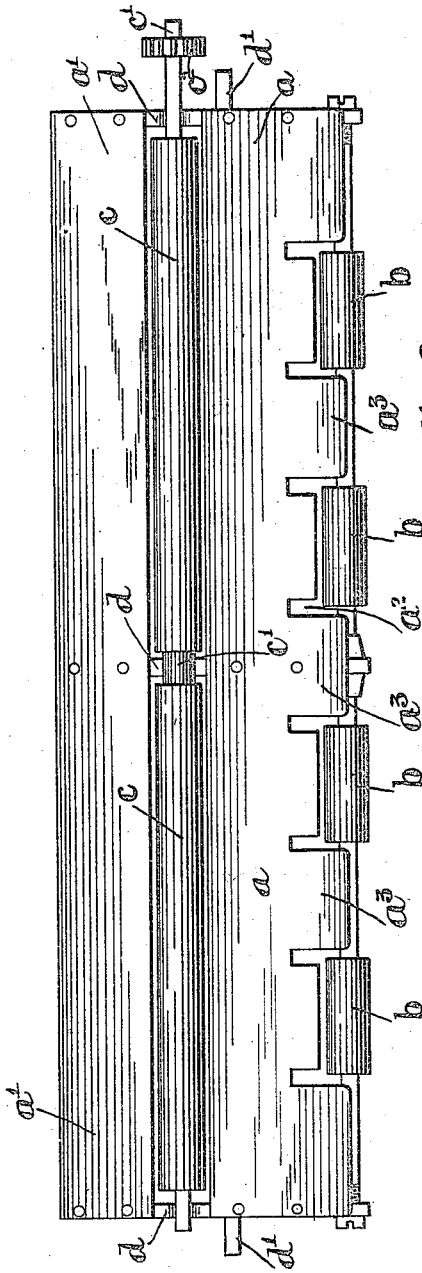
Figure 2:
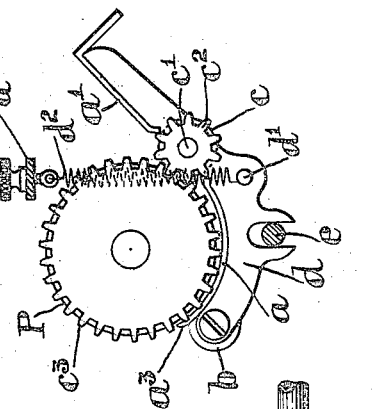
Figure 3:
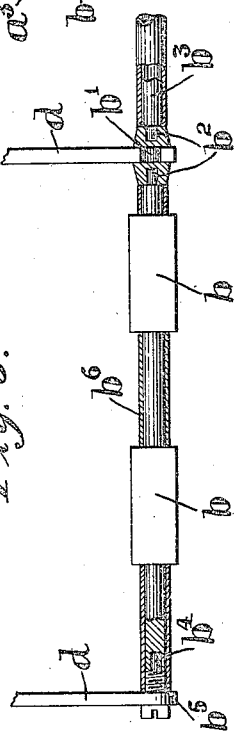

In the accompanying drawing:—Figure 1 is a detail plan view showing feed rolls and a pan adapted to coöperate with a cylindrical platen: Fig. 2 is an end view thereof: Fig. 3, a detail horizontal sectional view showing the manner of mounting the front feed roll: Fig. 4, an end elevation, partly in section, similar to Fig. 2, illustrating a modification in the structure: Fig. 5, a detail view showing a manner of positively driving both the front and rear feed rolls from the platen: Fig. 6, a detail plan view showing the pan or paper support located between the front and rear feed rolls as composed of a series of freely revoluble rods: Fig. 7, a detail end elevation showing another means of positively driving both the front and rear feed rolls from the platen: Fig. 8, a similar view showing another means of so driving said rolls: Fig. 9, a detail plan view with the platen broken away: Fig. 10, an end elevation indicating the mode of throwing off the feed devices: Fig. 11, a detail plan view showing a modification in the construction of the front edge of the paper pan: Fig. 12, a general plan view of the carriage, some parts being omitted and margin paper clamps being shown: Fig. 13, a detail transverse section on line 13, 13 of Fig. 12 showing one of the margin clamps and omitting the platen: Fig. 14, a detail rear elevation showing one of the margin clamps: and Fig. 15 an end elevation, with some of the shafts in section, on an enlarged scale, and showing some modifications.

The paper feed devices comprise a pan $a$ located between the front pressure roll $b$ and the rear pressure $c$, and a paper table $a'$ extending upwardly and rearwardly from the rear feed roll. The machine illustrated is a visible or front strike machine. Both feed rolls are located below the horizontal plane in which the axis of the platen lies and respectively in front and rear of a vertical plane passing through said axis. The shafts of the feed rolls are in a frame comprising three frame-plates $d$ set up on edge and connected by the pan $a$ and table $a'$.

The pan lying between the front and rear feed or pressure rolls is curved to conform to the contour of the platen. Each of the end frame plates $d$ has a projecting stud or lug $d'$ (Figs. 1 and 2) to which is applied a coiled spring $d^2$, vertically disposed and attached at its upper end to the eye of a threaded eye bolt passing through a fixed part or plate $d^3$ of the carriage frame and having applied to its threaded end an adjusting nut $d^4$. The plate $d^3$ may be rigidly attached to any appropriate part of the frame of the carriage. The location of the projecting pin $d'$ is designed to be at about the center of gravity of the frame, and the reaction of the springs $d^2$ tends to maintain both rolls in contact with the surface of the platen. Extending between the side plates of the carriage below the platen is a transverse rod $e$ lying within recesses or between jaws in the frame plates $d$. The rod $e$, therefore, acts as a guide in the vertical movement of the paper feeding and guiding devices. If, therefore, downward pressure be exerted upon the feed device frame, the reaction of $d^2$ will be overcome and the pan and feed rolls will move down together away from the face of the platen being guided by shaft $e$ and yet under all conditions of use, the frame is free to rock to preserve the relation, respectively, of the front and rear feed rolls to the platen. The paper feed and guiding devices may, therefore, be properly described as "floating," or as being loosely mounted, or as having such universality of movement as to adjust itself and maintain proper contact of both the front and rear rolls with the paper intervening between it and the platen; and yet both rolls may be simultaneously, and to the same or substantially the same extent, moved away from the platen by depression of the spring supported frame. The manner in which the frame may be so depressed is hereinafter described. The front edge of the pan section $a$ is slotted as at $a^2$ and recessed to accommodate the several sections $b$ into which the front roll is divided, four sections being shown. Between adjacent ends of these roll sections, the edge of the pan extends forwardly around the platen as seen at $a^3$, (Figs. 1 and 2). The rear roll is shown as composed of two sections and the shaft thereof is indicated as mounted in open bearings in the frame plates $d$. The sections of the front roll may be mounted as follows. The middle frame section $d$ has an open bearing to receive the circular reduced central part $b'$ of a hub whose opposite sides are recessed to receive the stud end $b^2$ of the sections $b^3$ of the shaft of the rolls. The opposite or outer ends of the shafts are respectively recessed to receive the reduced end or pintle $b^4$ of a screw bolt $b^5$ working in the end plates $d$ of the frame. The roll sections $b$ are loosely mounted on the shafts $b^3$ and are spaced by sleeves $b^6$ loosely enveloping the shafts. The roll sections are, therefore, designed to be independently revoluble and yet may revolve together should there be sufficient binding of the rolls between the sleeves or of the rolls upon their shaft since, the rolls, shafts and sleeves are all designed to be independently revoluble.

Fig. 11 shows a construction similar to Fig. 1 except that the parts $a^3$ of the pan projecting between the roll sections $b$ are divided by slots thus giving the front edge of the pan a greater degree of flexibility, which is desirable since it is designed that the front edge of the pan shall lie very closely adjacent the revolving face of the platen.

In Fig. 2, the shaft $c'$ of the rear feed roll is provided at one end with a toothed pinion $c^2$ with which engages a gear $c^3$ concentric to and turning with the platen P. The depth of engagement of the teeth is such as to permit desired depth of depression of the feed roll without the teeth passing out of engagement.

In Fig. 8 there is shown a similar toothed pinion $b^7$, on the shaft of the front feed roll, meshing with the gear $c^3$ turning with the platen. In this case there should be either gears $c^3$, $b^7$ at each end of the platen, or, the shaft of the front feed roll should be continuous. In Fig. 8, the plates $d$ are shown as further tied together by transverse rods $d^5$. Such tie rods may be used in any of the constructions shown in the drawings.

In Fig. 5 the roll shafts are each provided with a sprocket wheel $e'$, $e^2$ over which passes an endless sprocket chain $e^3$.

In Fig. 7, the front feed roll is driven from the toothed pinion of the rear feed roll by intermediate gears $e^4$, $e^5$, $e^6$, the last of which gears with the pinion $b^7$ on the front roll shaft. In all cases, the parts are so related and proportioned that the surface speed of the feed or pressure rolls is the same as that of the platen.

In Fig. 6, the paper pan lying between the front and rear feed rolls is shown as composed of freely revoluble cylinders or rods $f$ turning in bearings in the frame plates $d$. At the front, however, adjacent the front feed rolls there is a plate $f'$ forming the extreme front of the pan and adapted to occupy the same relation to the rolls and platen as is indicated at $a^3$ in Figs. 1 and 2.

Fig. 4 indicates the paper pan comprising the revoluble rods $f$. In addition to the lug or projection $d'$, to which is applied the coiled reaction spring $d^2$, there is a second similar lug $d^6$ on each of the end frame plates $d$ in front of the transverse guide rod $e$ and to each such lug is applied a coiled spring $d^7$ attached to an adjustable threaded bolt such as already described corresponding with that to which the spring $d^2$ is attached.

As seen in Figs. 9 and 10 there is at the right hand end of the rod $e$ outside of the end plate of the carriage a cam plate or projection $g$ and on the side plate is pivoted at $g'$ a hand lever $g^2$ in the form of a bell crank lever, the long upwardly extending arm of which has applied to it the usual finger piece and to the somewhat horizontally disposed shorter arm of which there is applied a roller $g^3$ adapted to work against the projection $g$ so that when the lever is rocked into position shown in the dotted lines the cam plate $g$ will be depressed until its surface is at right angles to a line passing through the point of contact between it and the roller $g^3$ and the axis $g'$, in which position the parts will remain when the lever is released. On the shaft $e$ adjacent each end of the platen is fixed a radial arm $h$ that extends rearwardly over the projections $d'$ on the end frame plates $d$; and, when the shaft $e$ is rocked by depression of the cam plate $g$, the arms $h$ come in contact with the projections $d'$ and depress the roll frame. In Fig. 9, the parts marked $i$, $i$ are merely bearings, on some fixed part of the carriage, for the shaft $e$.

Above the axis of the platen, and preferably in rear of the platen and extending between the side plates of the carriage, is a shaft $j$ square in cross section. Near each end of the shaft is a forwardly projecting arm $j'$ to which is attached the upper end of a coiled spring $j^2$, whose lower end is secured to a projection $j^3$ from the side of the end plate. The reaction of these springs tends to hold the shaft $j$ in normal position, the movement of the arms $j'$ being limited by stop plates $j^4$ on the side plates of the carriage. At the right hand end of this square shaft there is fitted a crank arm $k$ (Fig. 10) having in its end a laterally projecting pin $k'$ which extends into the path of the finger lever $g^2$. When, therefore, that lever is moved as indicated in dotted lines to depress the roll frame, the shaft $j$ is also rocked to thereby move away from the platen the margin paper clamps $m$ mounted thereon as seen in Figs. 12, 13 and 14; and all the parts will so remain in inoperative position until the finger lever is positively pushed rearwardly.

The margin paper clamps comprise forwardly extending arms embracing the front of the platen and carrying pressure rolls $m'$ in rear of which there is clearance space $m^2$ for the sheet which passes upwardly over the rear part $m^3$ of the margin clamp frame which embraces the square rod $j$. The margin clamp may, as shown, be formed of sheet metal which at the rear, is turned down at each side, forming ears $m^4$ having concentric circular openings embracing the square shaft $j$. Between the shaft and the top part of the clamp is interposed a bent plate spring $o$ whose ends $o'$ lie in slots in the ears $m^4$. This general construction provides for ready adjustment of the margin clamps longitudinally of the bar, they being held in any position to which they may be set by frictional pressure of the springs $o$. When the shaft is rocked, as described, both margin clamps will be elevated and in any position of the shaft either margin clamp may be positively turned by the operator upon the shaft to throw it up and rearwardly out of position, if desired. Margin paper clamps somewhat resembling those described, capable of the same manipulation and behavior and mounted upon a rotatable square or angular shaft are shown and claimed by me in my Patent No. 1,100,301, of June 16, 1914.

Fig. 15 shows, on an enlarged scale, a construction embodying the general feature of invention hereinbefore described with, however, certain modifications; and is that form of the apparatus that is preferred. In it there are the rear feed roll $c$, the front feed roll $b$, pan $a$, table $a'$ and frame, shown again, as comprising the parallel plates $d$. The frame plates $d$ are slotted and recessed to receive the guide shaft $e$ about which they may rock and on which they are vertically guided. A scale and alining bar $q$, normally below the line of print, is supported at its ends in arms $q'$ pivoted at their lower ends to a rocking lever $r$ turning on a transverse shaft $r'$ extending between the side plates of the machine. A spring $q^2$ connects each of the arms $q'$ with its lever $r$ (at each end of the carriage) and by their reaction tend to draw the scale bar against the face of the platen. When the lever $r$ is rocked so as to move its front portion upwardly, the scale bar will be carried to the line of print. The margin pressure devices are rolls $s$ carried in the upper ends of vertically disposed arms $s'$ mounted on a rocking shaft $t$ shown as a square shaft turning on trunnions $t'$. Attached to this shaft near each end is a vertically extending projection or bracket $u$ and to vertical posts $u'$ mounted in the upper face of the square shaft at the ends, outside said brackets, are applied springs $u^2$ tending by their reaction to draw the posts rearwardly and cause the margin clamp roll $s$ to bear against the face of the platen. The levers $r$ at the right hand end of the platen may consist of the horizontal forwardly projecting part to which the arm $q'$ is pivoted, a rearwardly extending horizontal part $r^2$ the end of which extends upwardly as at $r^3$ and a central arm $r^4$ extending vertically upward from the axis $r'$ and terminating in a finger piece $r^5$. The corresponding lever at the left hand end of the platen may however terminate at the point marked $x$ in Fig. 15. The parts $r^4$ of both levers have forwardly projecting lugs $r^6$ which come in contact with the square shaft $t$ above its axis so that reaction of springs $u^2$ will act upon the parts $r^4$ of the levers and tend to maintain them in normal position. Springs $r^7$ may however be connected to lugs on the under face of the bar $t$ and to the upright part $r^4$ of the lever. At each end of the carriage there is a forwardly extending lever arm $v$ turning about a transverse shaft $v'$ mounted, as are all the transverse shafts, in the carriage end plates. The front ends of the arms $v$ act upon the rear faces of the projections $u$ on the shaft $t$. Preferably, as shown, the front ends of these lever arms are formed by rollers $v^2$. A spring V for each arm $v$, is applied around the shaft $v'$ and serves to maintain it normally elevated. Extending downwardly from each of the arms $v$ is a projecting arm $v^3$ having on its outer face at or near its lower end an adjustable eccentrically mounted projection $v^4$ which lies immediately above the upturned end $r^3$ of the lever $r$. Below and in the path of each arm $v$ are lateral pins or projections $w$, $w'$ on the outer faces of the end plates $d$ of the frame of the paper feed devices. On the right hand end of the shaft $e$, which is mounted to turn in the side plates of the carriage is a lever arm X which extends forwardly over the adjustable projection $v^4$ and in rear of the shaft $e$ has a laterally projecting flange or plate $x$ which overlies the short end $y$ of an elbow lever Y pivoted at $y'$ and having an upwardly extended part $y^2$ to the end of which is applied a finger piece $y^3$. When the lever Y is moved rearwardly, its end $y$ acting upon the part $x$ of the lever arm X fast on the rock shaft $e$, at the right hand side of the machine, will rock that shaft and the forward end $x'$ of said lever arm,—there being a corresponding forward projection from said rock shaft at the left hand side of the machine. Both such projections $x'$ will act upon the projections $v^4$ on the parts $v^3$ of the lever arms $v$ at each side of the machine and will carry those arms downwardly until they engage (and preferably simultaneously engage) the projections $w$, $w'$ on the end frame plates $d$ thereby carrying down the frame, with the feed rolls and pan vertically. During this movement projection $v^4$ will engage the end of lever $r^3$ and rock the forward end of said lever upwardly to carry the scale bar to the printing line. Also during this operation, the roller ends $v^2$ of lever arms $v$ will act upon the rear face of the cam projections $u$ of rock shaft $t$ and carry the margin clamp rolls $s$ away from the platen. When the movement of lever $Y$ rearwardly has been carried to such point that the face of $x$ is at right angles to a line passing through the axis $y'$, the parts will be locked in inoperative or off position. To provide for the movement of the scale bar to the line of print without movement of the pressure or feed rolls away from the platen, the arm $r^4$ of lever $r$ is extended upwardly, as described. By movement rearwardly of its finger piece $r^5$, the scale bar will be raised to the printing point, the feed or pressure rolls remaining against the platen.

The arms $s'$ are at their lower end enlarged and embrace the square shaft $t$ being frictionally mounted thereon so that they may be moved laterally of the shaft or parallel with the axis of the platen. This may be conveniently accomplished by the finger pieces $s^2$ applied to the arms $s'$ at the point indicated or preferably nearer the shaft $t$.

The springs that serve to hold the paper feed devices in normal positions may be so constructed, arranged and adjusted as to serve where there is no paper in the machine merely to hold the rolls in contact with the surface of the platen with a minimum of pressure or tension i. e. with practically no tension, acting primarily as links rather than as springs. The spring tension that is imposed upon the rolls will then be created primarily by the inserted sheet or sheets of paper which act to separate the rolls from the platen or in other words to depress the feed devices and impose tension upon the springs $d^2$. These springs should be relatively heavy, as indicated in Fig. 15, so that very slight movement of the feed rolls away from the platen will impose such tension upon the springs that their reaction will effect proper feed of one or more inserted sheets.

I claim:

1. A visible writing machine comprising a rotatable platen, a floating or loosely mounted spring supported frame arranged below the platen, front and rear feed rolls carried thereby, a scale bar normally located below the line of print, a lever for moving the scale bar to the line of print and the paper feed frame away from the platen and a second lever for independently moving the scale bar to the line of print without moving the paper feed frame away from the platen.

2. A visible writing machine comprising a rotatable platen, a floating or loosely mounted spring supported frame arranged below the platen, front and rear feed rolls carried thereby, means for moving the frame downwardly away from the platen, margin paper clamps, a support therefor, and means operatively connecting the clamp support with the frame moving means for automatically moving said clamps away from the platen when the paper feed frame moving means is operated and the paper feed frame is moved away from the platen.

3. A visible writing machine comprising a rotatable platen, a floating or loosely mounted spring supported frame arranged below the platen, front and rear feed rolls carried thereby, means for moving the frame downwardly away from the platen, margin paper clamps adjustable longitudinally of the platen, a support for said clamps and means operatively connecting the clamp support with the frame moving means for automatically moving them out of engagement with the platen when the paper frame moving means is operated and the paper feed frame is moved away from the platen.

4. A visible writing machine comprising a rotatable platen, a floating or loosely mounted spring supported frame arranged below the platen, front and rear feed rolls carried thereby, an alining or scale bar normally located below the line of print, a lever for moving the scale bar to the line of print and the paper feed frame away from the platen, means for locking the frame in removed position and a second lever for moving the scale bar to the line of print without moving the frame away from the platen.

5. A visible writing machine comprising a rotatable platen, a floating or loosely mounted spring supported frame arranged below the platen, front and rear feed rolls carried thereby, means for moving the frame downwardly away from the platen, margin paper clamps, a support therefor, means operatively connecting the clamp support with the frame moving means for automatically moving said clamps away from the platen when the paper feed frame is moved away from the platen and means for locking the frame in removed position.

6. A visible writing machine comprising a rotatable platen, a floating or loosely mounted spring supported frame arranged below the platen, front and rear feed rolls carried thereby, means for moving the frame downwardly away from the platen, margin paper clamps adjustable longitudinally of the platen, a support for said clamps means operatively connecting the clamp support with the frame moving means for automatically moving them out of engagement with the platen when the paper feed frame is moved away from the platen and means for locking the frame in removed position.

7. A visible writing machine comprising a rotatable platen, a floating or loosely mounted spring supported frame comprising end plates and a connecting paper table, front and rear feed rolls carried thereby, means carried by said end plates for positively driving the rear feed rolls at the same surface speed as that of the platen, a transverse shaft embraced by the end plates upon which the frame is movable toward and from the platen and about which the frame may rock and means for moving the frame away from the platen.

8. A visible writing machine comprising a rotatable platen, a floating or loosely mounted spring supported frame comprising end plates and a connecting paper table, front and rear feed rolls carried by said end plates and an interposed paper pan also carried by the end plates, means for positively driving the rear feed rolls at the same surface speed as that of the platen, a transverse shaft embraced by the end plates upon which the frame is movable toward and from the platen and about which the frame may rock and means for moving the frame away from the platen.

9. A visible writing machine comprising a rotatable platen, a floating or loosely mounted spring supported frame arranged below the platen, front and rear feed rolls carried thereby, means for positively driving both the front and rear feed rolls at the same surface speed as that of the platen, means for moving the frame downwardly away from the platen, an alining or scale bar normally located below the line of print, means for automatically moving it to the line of print when the paper feed frame is moved away from the platen and means for independently moving said bar to the line of print without moving the paper feed frame away from the platen.

10. A visible writing machine comprising a rotatable platen, a floating or loosely mounted spring supported frame arranged below the platen, front and rear feed rolls carried thereby, means for positively driving the rear feed rolls at the same surface speed as that of the platen, means for moving the frame downwardly away from the platen, margin paper clamps a support therefor and means operatively connecting the clamp support with the frame moving means for automatically moving said clamps away from the platen when the paper feed frame is moved away from the platen.

11. A visible writing machine comprising a rotatable platen, a floating or loosely mounted spring supported frame arranged below the platen, front and rear feed rolls carried thereby, means for positively driving the rear feed rolls at the same surface speed as that of the platen, means for moving the frame downwardly away from the platen, margin paper clamps adjustable longitudinally of the platen, a support for said clamps and means operatively connecting the clamp support with the frame moving means for automatically moving them out of engagement with the platen when the paper feed frame is moved away from the platen.

12. A visible writing machine comprising a rotatable platen, a floating or loosely mounted spring supported frame comprising end plates and a connecting paper table, front and rear feed rolls carried by said end plates, means for positively driving the front and rear feed rolls at the same surface speed as that of the platen, a transverse shaft embraced by the end plates upon which the frame is movable toward and from the platen and about which the frame may rock and means for moving the frame away from the platen.

13. A visible writing machine comprising a rotatable platen, a floating or loosely mounted spring supported frame comprising end plates and a connecting paper table, front and rear feed rolls carried by said plates and an interposed paper pan also carried by said plates, means for positively driving the front and rear feed rolls at the same surface speed as that of the platen, a transverse shaft embraced by the frame upon which the end plates are movable toward and from the platen and about which the frame may rock and means for moving the frame away from the platen.

14. A visible writing machine comprising a rotatable platen, a floating or loosely mounted spring supported frame arranged below the platen, front and rear feed rolls carried thereby, means for positively driving the front and rear feed rolls at the same surface speed as that of the platen, means for moving the frame downwardly away from the platen, an alining or scale bar normally located below the line of print, means for automatically moving it to the line of print when the paper feed frame is moved away from the platen and means for independently moving said bar to the line of print without moving the paper feed frame away from the platen.

15. A visible writing machine comprising a rotatable platen, a floating or loosely mounted spring supported frame comprising end plates and a connecting paper table arranged below the platen, front and rear feed rolls carried by the end plates, means for positively driving the front and rear feed rolls at the same surface speed as that of the platen, means for moving the frame downwardly away from the platen, margin paper clamps, a support therefor and means operatively connecting the clamp support with the frame moving means for automatically moving said clamps away from the platen when the paper feed frame is moved away from the platen.

16. A visible writing machine comprising a rotatable platen, a floating or loosely mounted spring supported frame comprising end plates and a connecting paper table arranged below the platen, front and rear feed rolls carried by the end plates, means for positively driving the front and rear feed rolls at the same surface speed as that of the platen, means for moving the frame downwardly away from the platen, margin paper clamps adjustable longitudinally of the platen a support for the clamps and means operatively connecting the clamp support with the frame moving means for automatically moving them out of engagement with the platen when the paper feed frame is moved away from the platen.

17. A visible writing machine comprising a rotatable platen, a floating or loosely mounted spring supported frame arranged below the platen, front and rear feed rolls carried by the frame, a transverse rock shaft about which the frame may rock and which serves as a guide for movement of the frame away from the platen, means for rocking the shaft and an operative connection between the shaft and said frame whereby the latter is moved away from the platen when the shaft is rocked from normal position.

18. A visible writing machine comprising a rotatable platen, front and rear feed rolls, margin paper clamps carried by arms mounted below the platen, means for at will simultaneously throwing the front and rear feed rolls and margin clamps out of operative relation with the platen and means for locking the parts in inoperative position.

19. A visible writing machine comprising a rotatable platen, a floating or loosely mounted spring supported frame arranged below the platen, front and rear feed rolls carried by the frame, a transverse rock shaft about which the frame may rock and which serves as a guide for movement of the frame away from the platen, means for rocking the shaft and an operative connection between the shaft and said frame whereby the latter is moved away from the platen when the shaft is rocked from normal position combined with margin clamps and means for automatically moving the clamps away from the platen when the front and rear feed rolls are so moved.

20. A visible writing machine comprising a rotatable platen, a floating or loosely mounted spring supported frame arranged below the platen, front and rear feed rolls carried by the frame, a transverse rock shaft about which the frame may rock and which serves as a guide for movement of the frame away from the platen, means for rocking the shaft and an operative connection between the shaft and said frame whereby the latter is moved away from the platen when the shaft is rocked from normal position, combined with a scale bar normally located below the line of print and means for automatically raising it to the line of print when the feed rolls are moved away from the platen.

21. A visible writing machine comprising a rotatable platen, a floating or loosely mounted spring supported frame arranged below the platen, front and rear feed rolls carried by the frame, a transverse rock shaft about which the frame may rock and which serves as a guide for movement of the frame away from the platen, means for rocking the shaft and an operative connection between the shaft and said frame whereby the latter is moved away from the platen when the shaft is rocked from normal position combined with margin clamps and means for automatically moving the clamps away from the platen when the front and rear feed rolls are so moved and means for locking the parts in removed or inoperative position.

22. A visible writing machine comprising a rotatable platen, a floating or loosely mounted spring supported frame arranged below the platen, front and rear feed rolls carried by the frame, a transverse rock shaft about which the frame may rock and which serves as a guide for movement of the frame away from the platen, means for rocking the shaft and an operative connection between the shaft and said frame whereby the latter is moved away from the platen when the shaft is rocked from normal position, combined with a scale bar normally located below the line of print, means for automatically raising it to the line of print when the feed rolls are moved away from the platen and means for locking the parts in removed or inoperative position.

23. A visible writing machine comprising the combination of a rotatable platen, a floating or loosely mounted spring supported frame located below the platen and front and rear feed rolls carried thereby, front margin clamps a rock shaft by which they are carried located below the platen, means for moving the floating frame downwardly and means operated by a part of said frame moving means during the downward movement of said floating frame for then automatically rocking the margin clamp shaft to carry the clamps away from the platen.

24. A visible writing machine comprising the combination of a rotatable platen, a floating or loosely mounted spring supported frame located below the platen and front and rear feed rolls carried thereby, front margin clamps, a rock shaft upon which they are mounted for adjustment longitudinally of the platen located below the platen, means for moving the floating frame downwardly and means operated by a part of said frame moving means during the downward movement of said floating frame for then automatically rocking the margin clamp shaft to carry the clamps away from the platen.

25. A visible writing machine comprising the combination of a rotating platen, a floating or loosely mounted spring supported frame located below the platen, feed rolls carried thereby, margin clamps, horizontally arranged lever arms $v$, means for depressing them and operative connections by which when the arms are depressed said frame is moved downwardly and the margin clamps are moved away from the platen by the free ends of the lever arms.

26. A visible writing machine comprising the combination of a rotating platen, a floating or loosely mounted spring supported frame located below the platen, feed rolls carried thereby, margin clamps, horizontally arranged lever arms $v$, means for depressing them and operative connections by which when the arms are depressed said frame and margin clamps are moved away from the platen combined with a scale bar normally located below the line of print and means whereby it is automatically moved to the line of print when the feed rolls and margin clamps are thrown out of operative relation to the platen.

27. A visible writing machine comprising the combination of a rotating platen, a floating or loosely mounted spring supported frame located below the platen, feed rolls carried thereby, margin clamps, horizontally arranged lever arms $v$, means for depressing them and operative connections by which when the arms are depressed said frame and margin clamps are moved away from the platen combined with a scale bar normally located below the line of print and means whereby it is automatically moved to the line of print when the feed rolls and margin clamps are thrown out of operative relation to the platen and means for independently moving the scale bar to the line of print.

In testimony whereof, I have hereunto subscribed my name.

EDWARD B. HESS.

Witnesses:
S. A. HASTING,
L. F. BROWNING.

Copies of this patent may be obtained for five cents each, by addressing the "Commissioner of Patents, Washington, D. C."